United States Patent [19]

Asada et al.

[11] Patent Number: 4,749,872
[45] Date of Patent: Jun. 7, 1988

[54] DOCUMENT SCAN APPARATUS WITH REFLECTIVE REFERENCE POSITION MARKER

[75] Inventors: Shigeki Asada; Megumi Hasegawa, both of Fujisawa, Japan

[73] Assignee: International Business Machines Corporation, Armonk, N.Y.

[21] Appl. No.: 918,743

[22] Filed: Oct. 14, 1986

[30] Foreign Application Priority Data

Dec. 27, 1985 [JP] Japan .................... 60-293404

[51] Int. Cl.⁴ .............................. H04N 1/04
[52] U.S. Cl. ....................... 250/578; 358/293; 355/75
[58] Field of Search ............. 250/578; 358/285, 293, 358/294; 355/13, 14 SH, 75

[56] References Cited

U.S. PATENT DOCUMENTS

| | | | |
|---|---|---|---|
| 4,538,185 | 8/1985 | Wiggins | 358/294 |
| 4,630,127 | 12/1986 | Fuwa | 358/294 |
| 4,641,357 | 2/1987 | Satoh | 358/285 |

FOREIGN PATENT DOCUMENTS 0124366 7/1983 Japan .

*Primary Examiner*—Edward P. Westin
*Assistant Examiner*—Charles Wieland
*Attorney, Agent, or Firm*—John J. Goodwin

[57] ABSTRACT

A document scan apparatus in which the position of a document support table relative to an optical system is detected during the relative movement between the document support platen and the optical system. A reference position marker is mounted on the document support table which directly reflects a light from a document illumination light source into an optical sensor array or a CCD sensor array through a mirror and a lens for causing the CCD sensor array to operate in a saturated range to generate a higher output signal level than an expected highest signal level of the CCD sensor array in the document scan operation; and by setting a threshold level of a comparator circuit to a high level which is exceeded by the higher output signal level of the CCD sensor array. The reference position marker is positioned within the field of view of the CCD sensor array for sensing the image of the document, so that the CCD sensor array sensing the document image also senses the reference position marker.

8 Claims, 6 Drawing Sheets

DOCUMENT SCAN APPARATUS WITH REFLECTIVE REFERENCE POSITION MARKER

FIELD OF THE INVENTION

The invention relates to a document scan apparatus in which the position of a document support platen or table relative to an optical system is detected during the relative movement between the document support platen and the optical system.

BACKGROUND OF THE INVENTION

In the document scan apparatus which scans an image of a document supported on the document support table, a reference position of the document support platen relative to the optical system is detected during the relative movement of the document support platen and the optical system to control the scan operation of the document. In a typical case, the optical system, including a light source, mirror and a CCD (Charge Coupled Device) sensor array, if fixedly mounted, and the document support table is reciprocally moved relative to the optical system. Published unexamined Japanese patent application 58-124366, published on July 23, 1983 shows a slit pattern provided on a side area of a document support table. A CCD sensor array has first portion which senses the reflected light from the slit pattern, and second portion which senses the reflected light from the document image, during the movement of the table. A control unit controls the movement of the document support table in response to output signal of the CCD sensor array representing the slit pattern. The document scan apparatus in the application 58-124366 requires the above first portion of the CCD sensor array for the slit pattern, and increased width of the table, resulting in the cost up of the document scan apparatus.

To solve the problem, the inventors of the present invention had initially tried to replace the side slit mark by a reference position mark located near the top edge of a document area of the document support table. In this type of arrangement, the CCD sensor array assigned for the document image could also senses the reference position mark. In other words, the CCD sensor array senses the reference position mark at the first, then senses the document image. But, this approach had a new problem that since the documents to be scanned could include unexpected various patterns, the probability of occurrence of the same pattern in the documents as the pattern of the reference position mark could not be reduced to zero percent. If the same pattern as the reference position mark appears in the document, the case might be happen that the control unit of the document scan apparatus might erroneously determine the pattern of the document as the reference position mark, resulting in an error in the document scan. Accordingly, it has been required to distinguish the reference position mark located within the field of view of the CCD sensor array for sensing the document image from the document image.

SUMMARY OF THE INVENTION

The invention solves the problems stated hereinbefore by arranging or mounting on the document support table a reference position marker which directly reflects a light from a document illumination light source into an optical sensor array or a CCD sensor array through a mirror and a lens for causing the CCD sensor array to operate in a saturated range to generate a higher output signal level than an expected highest signal level of the CCD sensor array in the document scan operation; and by setting a threshold level of a comparator circuit to a high level which is exceeded by the higher output signal level of the CCD sensor array. The reference position marker is positioned within the field of view of the CCD sensor array for sensing the image of the document, so that the CCD sensor array sensing the document image also senses the reference position marker. Accordingly, the CCD elements of the first portion as stated in the description of the application 58-124366 is not required in the present invention.

The threshold level in the comparator circuit is set to the high threshold level for sensing the reference position marker at the start of the relative movement of the document support table, and is set to a low threshold level for generating bi-level signals representing the image of the document after the reference position marker is recognized.

DETAILED DESCRIPTION OF THE INVENTION

Figure 1:
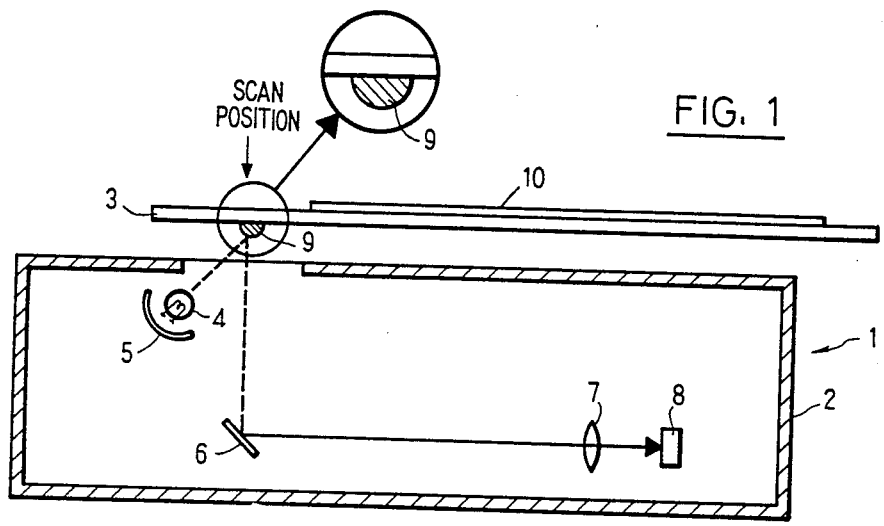
FIG. 1 shows a document scan apparatus in accordance with the present invention with a front wall being partially broken to show an optical system inside of the apparatus.

Referring to FIG. 1, the document scan apparatus 1 in accordance with the present invention is shown. The document scan apparatus 1 comprises a main frame 2 and the document support table 3. The document support table 3 is movably mounted to the main frame 2 by a guide and drive mechanism, not shown, to cause the document support table 3 to relatively move to the main frame 2. In this exemplary embodiment, the document support table 3 is reciprocally moved, while the optical system is stationary mounted. However, an alternative arrangement including a fixed document support table and a movable optical scan system could be also used to realize the relative movement thereof. The optical system includes a light source or tungsten lamp 4, a reflector 5, a mirror 6, a lens 7 and the CCD sensor array 8. The document 10 is placed on the document support table 3 with an image of the document being faced on a glass platen or a document area of the table 3.

Figure 2:
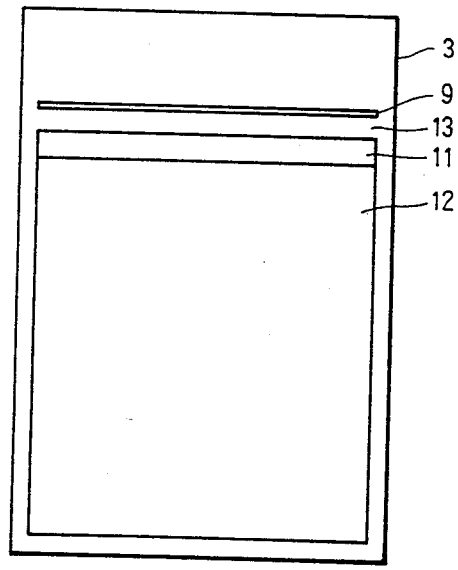
FIG. 2 shows the backside of a document support table of the document scan apparatus facing to the optical system.

FIG. 2 shows the backside of the document support table 3. The reference position marker 9 and a white band area 11 are mounted. The reference number 12 indicates the glass platen or document area. The reference position marker 9 is positioned within the field of view of the CCD sensor array for sensing the image of the document.

In the embodiment, the reference position marker 9 is positioned in parallel with the top edge of the white band area 11 and the document area 12, as shown in the FIG. 2. The structure and the function of the reference position marker 9 will be later described.

Figure 3:
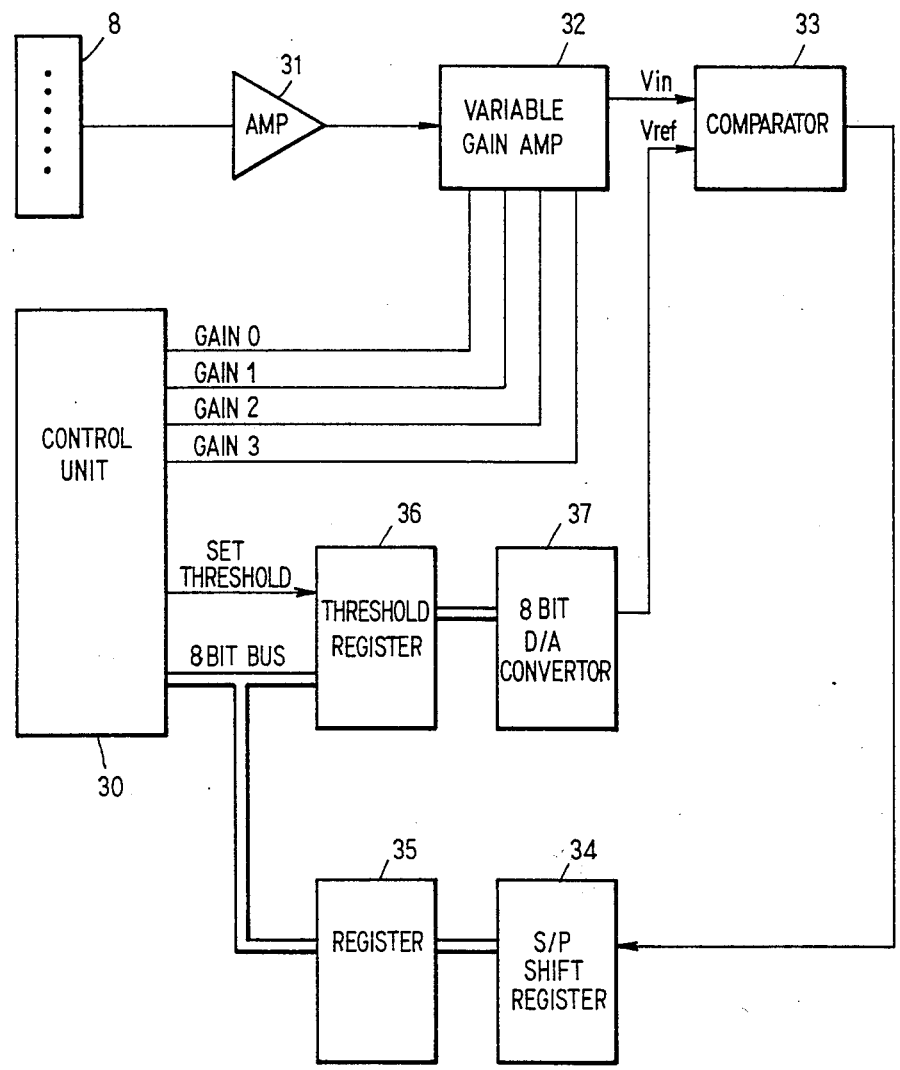
FIG. 3 shows a circuit block diagram of the document scan apparatus.

FIG. 3 shows the circuit block diagram of the document scan apparatus 1. The CCD sensor array 8 has 2048 small photoelectric conversion elements, for example, each of which defines one pel (picture element) of an image of the document. Analog signals of 2048 small photoelectric conversion elements are serially applied to the output line of the CCD sensor array 8, and applied to a variable gain amplifier 32 through a preamplifier 31. The amplified analog signal for each pel is compared with a threshold voltage in a comparator circuit 33, which generates "1" signal when the analog signal exceeds the threshold level, and generates "0" signal when the analog signal is smaller than the threshold level, thus the analog signals are converted into the bi-level video data. The serial bi-level data on the output line of the comparator circuit 33 are supplied to a serial/parallel shift register 34 which converts the serial bi-level data to eight bit parallel data. The eight bit parallel data are supplied to a register 35 from which the bi-level data are supplied to a control unit 30 through an eight bit data bus. The control unit 30 controls a gain of the variable gain amplifier 32 through gain control lines, supplies a threshold level to the comparator circuit 33 through a threshold register 36 and a eight bit digital-/analog convertor 37, and controls a step motor of the table drive mechanism, not shown, and the entire operations of the circuits blocks.

Figure 4:
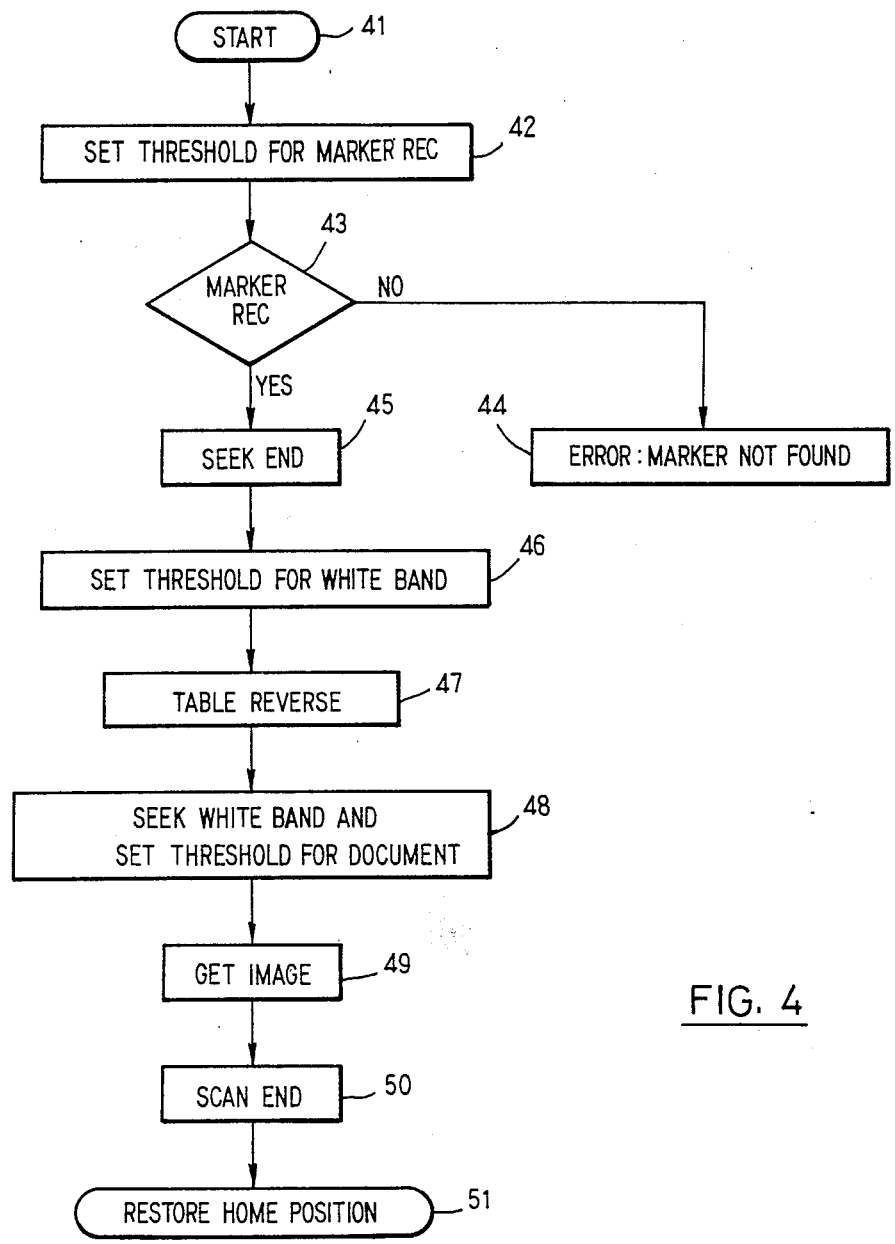
FIG. 4 shows a flow chart which indicates operational steps of the circuit block shown in the FIG. 3.

Describing the operations of the document scan apparatus 1 with referring to the FIGS. 3 and 4, the control unit 30 starts the document scan operation in response to an operator's depress of a start switch, not shown, a start command sent from a host system, etc., as shown in a block 41 of FIG. 4.

The operation proceeds to a block 42 in which the control unit 30 sets the threshold level of the comparator circuit 33 to a high threshold level for finding the reference position marker 9 of the document support table 3 shown in FIGS. 1 and 2, and moves the table 3 in the right ward direction.

Describing the reference position marker 9 shown in FIGS. 1 and 2, it has a round cross section and a high reflectance surface to directly reflect a light generated from a lamp 4 to CCD sensor array 8 through the mirror 6 and the lens 7, whereby a stronger light than a light reflected during the document image scan operation is directed to the CCD sensor array 8. The stronger light causes the CCD sensor array 8 to operate in its saturated range to generate a higher output signal level than an expected highest signal level during the document scan operation. And, the reference position marker 9 has a semicircle cross section by which an optical path for directing the high intensity light from the lamp 4 into the CCD sensor array 8 is necessarily established between the lamp 4 and the CCD sensor array 8. One example of the reference position marker 9 is a metal wire with a plated high reflectance surface and a diameter of 2–3mm. The marker 9 extends over the field of view of the CCD sensor array at a position apart from the top edge of the white band area 11, as shown in FIG. 2.

Figure 5A:
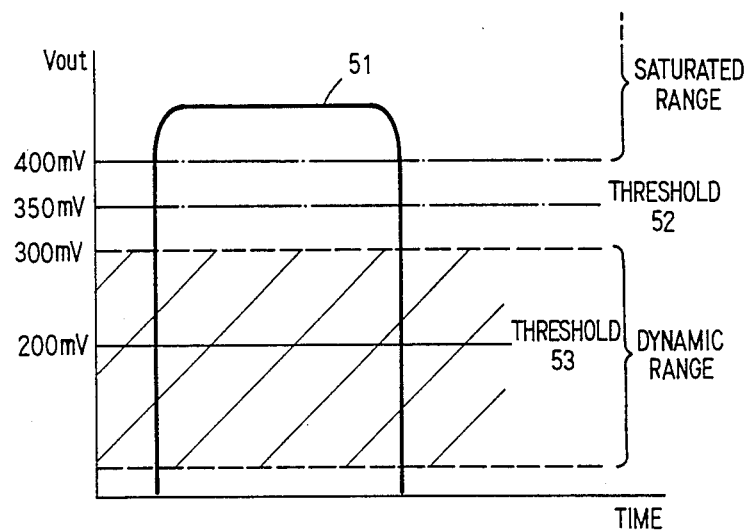
FIGS. 5A and 5B show input signals of the comparator circuit and threshold levels in a marker recognition operation and a document scan operation, respectively.

FIG. 5A shows an input analog signal 51 to the comparator circuit 33 which is generated when the light from the lamp 4 is directly projected into the CCD sensor array 8 and it becomes the saturated condition; and the high threshold level 52 which is selected so that it is exceeded by the signal 51, but not exceeded by the expected highest signal within dynamic range of the CCD sensor array during the document scan operation.

Returning to FIG. 4, the operation proceeds to a block 43 in which the control unit 30 determines the bi-level data supplied from the register 35 through the eight bit data bus. If the "1" signals exist over the length of the reference position marker 9, the control unit 30 judges as the recognition of the marker 9, and the operation proceeds to a block 45 wherein the seek operation for the marker 9 is terminated. If the marker 9 is not found, the control unit 30 handles it as an error, as shown in a block 44.

Figure 5B:
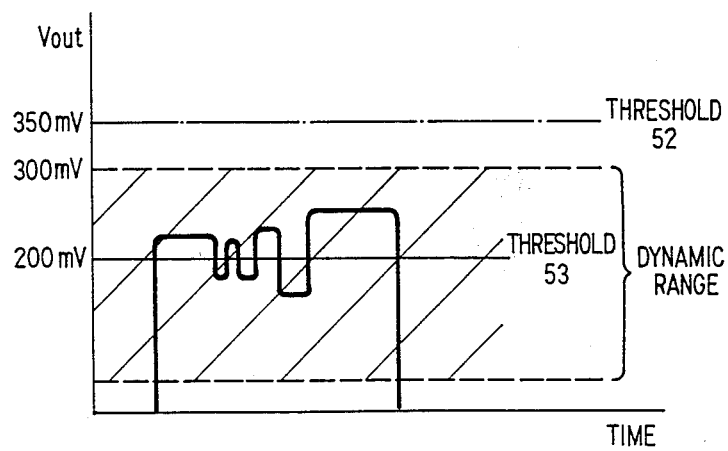

The operation proceeds to a block 46 in which the control unit 30 sets a threshold level for finding or seeking the white band area 11 shown in the FIG. 2 into the comparator circuit 33. Then, the control unit 30 stops the movement of the document support table 3 in the right ward direction and moves the table 4 in the left ward direction, in a block 47. Next, the control unit 30 seeks the white band area 11, and sets a threshold level 53 for the document scan operation, as shown in FIG. 5B, in the comparator circuit 33. More detail operation of the blocks 46, 47 and 48 will be latter described with referring to the FIG. 8.

As the document support table 3 moves in the leftward direction in the scan position, the document 10 comes into the field of view of the CCD sensor array 8, and the bi-level data representing the image of the document is supplied to the control unit 30 from the register 35 through the eight bit data bus. When the document area 12 has been scanned in a block 49, the table 3 is stopped, block 50, and the table 3 is restored to the home position, block 51. An example of the home position is a position in which the left edge of the table 3 in FIG. 1 is aligned to the left side wall of the main frame 2.

Figure 6A:
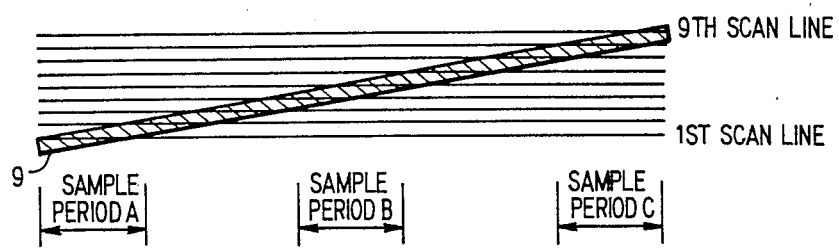
FIGS. 6A, 6B, 6C and 6D show a reference position marker with a skew to a CCD sensor array, and sampled output signals for recognizing the reference position marker.
Figure 6B:
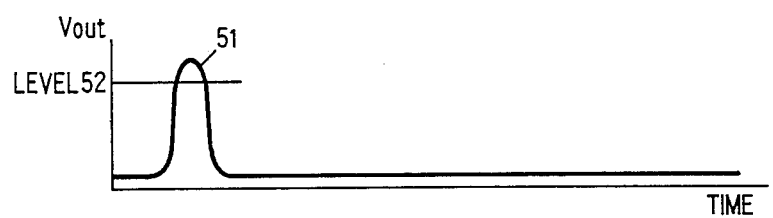
Figure 6C:
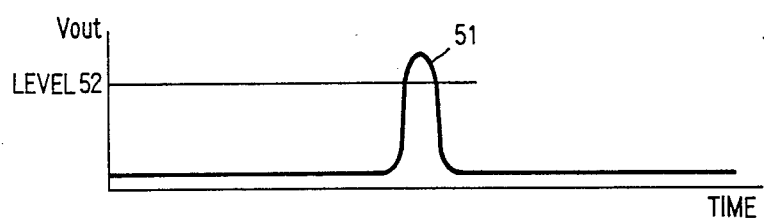
Figure 6D:
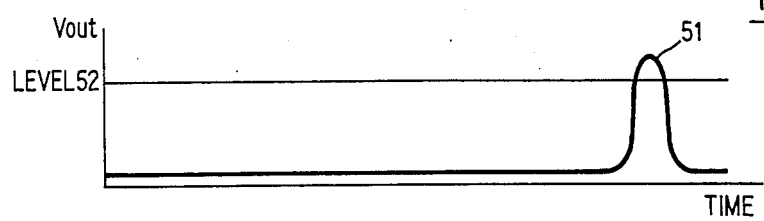

FIGS. 6A through 6D show the detection of the reference position marker 9 with a skew with respect to the CCD sensor array 8. The skew would be caused by a mechanical misarrangement over a long use of the guide and drive mechanism of the document support table 3 and others. FIG. 6A shows the reference position marker 9 skewed over nine scan lines scanned by the CCD sensor array 8, with a reduced width of the marker compared to the space between the scan lines. FIGS. 6B, 6C and 6D show the analog signals 51 supplied to the comparator circuit 33 when the high intensity light generated from the lamp 4 is reflected into the CCD sensor array 8 by the high reflectance surface of the reference position marker 9 by which the CCD sensor array 8 is saturated to generate the high level output signal. The control unit 30 samples the bi-level output "1" of the comparator circuit 33 during the sample periods A, B and C in the marker recognition operation in the block 43 of FIG. 4, described hereinbefore. The control unit 30 could find the top edge of the document area 12 based upon the time when the signal 51 is recognized during the sample period A, for example, since the control unit knows the distance between the marker 9 and the top edge of the document area 12 due to the number of steps of the step motor, so that the document scan operation with the document scan threshold 53, FIG. 5B is started from the top edge of the document area 12. Describing the area 13 located between the marker 9 and the white band area 11, as shown in FIG. 2, this area 13 is colored black, and its length in the direction of the table movement is selected to allow the sufficient recovery of the CCD sensor array 8 from its saturated condition to the normal operating condition or the dynamic range.

Figures 7A, 7B, 7C:
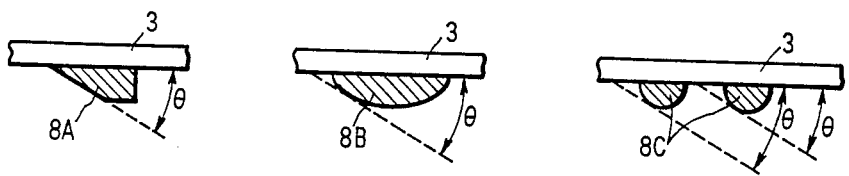
FIGS. 7(A,B and C) shows cross sections of alternative structures of the reference position marker.

FIG. 7 shows cross sections of alternate structures of the reference position marker 9. As stated above, the function of the marker 9 is to directly reflect the high intensity light from the lamp 4 to the CCD sensor array, to cause the CCD sensor array 8 to operate in the saturated operational range. To this end, the marker 9 is provided with the high reflectance surface and the surface angle $\theta$ in the cross section to establish the optical reflection path of the high intensity light from the lamp 4 to the CCD sensor array 8. The marker 8A has a flat surface of the angle $\theta$. The marker 8B has semi-ellipse cross section, and the marker 8C has a double semi-ellipse structure placed in parallel which reflects the high intensity light twice in the marker recognition as the table 3 is moved, and the control unit 30 senses the bi-level "1" data generated twice as the marker signal.

Although, in the described embodiment, the marker 9 extends over the entire length corresponding to the width of the document, in parallel with the top edge of the white band area 11, shorter marker than the marker 9 shown in FIG. 2 could be placed in corresponding positions to the sample periods A, B and C shown in FIG. 6A.

In the document scan operation, the light from the lamp 4 is projected into the CCD sensor array by diffuse reflection or irregular reflection at the document surface, so that the light intensity due to the diffuse reflection in the document scan operation is remarkably lower than the high intensity light in the marker recognition operation, as shown in FIGS. 5A and 5B.

Figure 8:
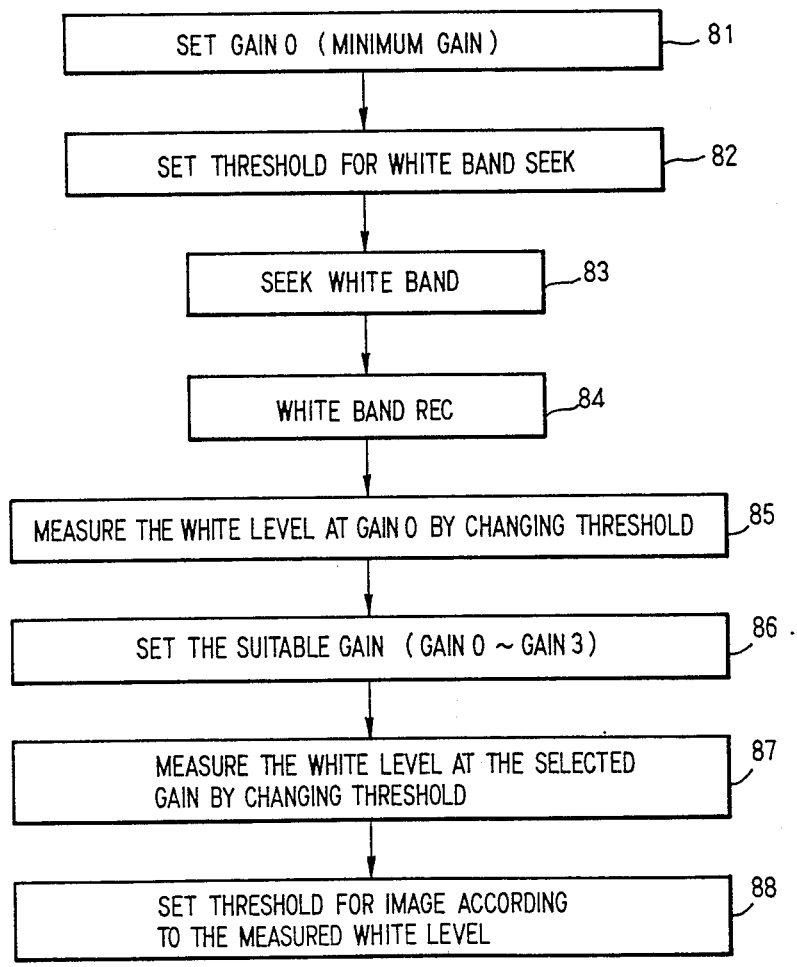
FIG. 8 shows a flow chart describing detail operations for determining a threshold level for scanning an image of a document.

FIG. 8 shows a flow chart for explaining the detail operation of the blocks 46–48 in FIG. 4.

In a block 81, the control unit 30 sets the gain of the variable gain amplifier 32 to the gain "0" which is the minimum gain for the amplifier.

In a block 82, the control unit 30 sets a threshold level for searching a white level in the threshold register 36. The level is converted to an analog level by the digital-/analog convertor 37, and the analog threshold level is applied to the Vref input of the comparator circuit 33. The threshold level for searching the white level is a level that is lower than a white level signal applied to the Vin input of the comparator circuit 33 through the variable gain amplifier 32, a gain of which is set to a gain "0". As the document support table 3 moves in the rightward direction, the white band area 11 approaches to the scan position. Since the area 13 is scanned until the top of the white band area 11 reaches to the scan position, the bi-level outputs of the comparator circuit 33 remain "0" level. When the top edge of the white band area 11 crosses the scan position, the bi-level outputs of the comparator circuit 33 changes to "1" level. The control unit 30 detects this transition as the arrival of the white band area 11 at the scan position, as shown in blocks 83 and 84. In a block 85, the control unit 30 measures the white level of the white band area 11 by varying the threshold level with the gain of the variable gain amplifier 32 maintained at the gain "0", detecting a transition from "1" to "0" of the bi-level output data of the comparator circuit 33, and deciding a threshold level at which the transition is detected as the white level of the white band area 11.

In a block 86, the control unit 30 selects from the gain 0-3 a suitable gain of the variable gain amplifier 32 to amplify the output signal of the CCD sensor array 8 for accommodating the amplified output signal within an input range of the comparator circuit 33, so that output signals of a CCD sensor array with an unknown sensitivity are adjusted to the input range of the comparator circuit 33.

In a block 87, the control unit 30 measures the level of the white band area 11 at the selected gain by varying the threshold level with the selected gain, detecting a transition between "1" and "0" of the bi-level output data of the comparator circuit 33, and deciding a threshold level at which the transition is detected as the white level of the white band area 11.

In a block 88, the control unit 30 sets the threshold for the image of the document in accordance with the measured white level.

We claim:

1. A document scan apparatus comprising:
an optical system including a single light source and an optical sensor array, which generates output signal in response to incident light from said light source.
a document support table relatively moved to said optical system and in the path of light from said single light source,
a reference position marker mounted on said document support table for directly reflecting a greater intensity of light from said signal light source to said optical sensor array to operate said optical sensor array in a higher range than a range for a lesser intensity of light from said single light source reflected from the scaning of a document,
a comparator means coupled to said optical sensor array for comparing output signals of said optical sensor array with a threshold level to generate bi-level signals, and
a control means for setting said threshold level of said comparator means to a level which is exceeded by output signals of said optical sensor array operated in said higher range responsive to said light reflected from said reference position marks.

2. The document scan apparatus of claim 1 in which said optical sensor array is CCD (Charge Coupled Device) sensor array.

3. The document scan apparatus of claim 1 in which said reference position marker is an elongated body, and has a round cross section with a surface of high reflectance.

4. The document scan apparatus of claim in which said higher range is a saturated range of said optical sensor array.

5. A document scan apparatus comprising:
an optical system including a single light source and a CCD (Charge Coupled Device) sensor array which generates output signal in response to incident light,
a document support table relatively moved to said optical system,
a reference position marker mounted on said document support table for reflecting a light of such intensity from said single light source to said CCD sensor array to operate said CCD sensor array in a saturated range which is higher than a range for scanning a document, a comparator means coupled to said CCD sensor array for comparing output signals of said CCD sensor array with a threshold level to generate bi-level signals, and a control means responding a start signal for setting said threshold level of said comparator means to a high level which is exceeded by output signals of said CCD sensor array operated in said saturated range, determining said bi-level signals to detect said reference position marker, and replacing said high threshold level by a low threshold level for causing said comparator means to generate bi-level signals representing an image of document.

6. The document scan apparatus of claim 5 in which said reference position marker is positioned within the field of view of said CCD sensor array which scans an image of a document.

7. The document scan apparatus of claim 5 in which said reference position marker is an elongated body, and has a round cross section with a surface of high reflectance.

8. The document scan apparatus of claim 7 in which said reference position marker is positioned in parallel a top edge of a document area of said document support table.

* * * * *